(12) United States Patent
Hamaguchi et al.

(10) Patent No.: US 10,606,422 B2
(45) Date of Patent: Mar. 31, 2020

(54) CAPACITANCE DETECTION METHOD, POSITION DETECTION METHOD, TOUCH PANEL CONTROLLER, AND ELECTRONIC DEVICE

(71) Applicant: SHARP KABUSHIKI KAISHA, Sakai, Osaka (JP)

(72) Inventors: Mutsumi Hamaguchi, Sakai (JP); Masayuki Miyamoto, Sakai (JP); Shinji Shinjo, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 131 days.

(21) Appl. No.: 15/755,552

(22) PCT Filed: Jun. 21, 2016

(86) PCT No.: PCT/JP2016/068389
§ 371 (c)(1),
(2) Date: Feb. 27, 2018

(87) PCT Pub. No.: WO2017/038215
PCT Pub. Date: Mar. 9, 2017

(65) Prior Publication Data
US 2018/0246593 A1 Aug. 30, 2018

(30) Foreign Application Priority Data
Aug. 31, 2015 (JP) .................... 2015-171373

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01); *G06F 3/0416* (2013.01); *G06F 2203/04103* (2013.01)

(58) Field of Classification Search
CPC .................................. G06F 3/41; G06F 3/044
See application file for complete search history.

(56) References Cited

U.S. PATENT DOCUMENTS

2012/0268416 A1* 10/2012 Pirogov ................ G06F 3/0416
345/174
2014/0104236 A1* 4/2014 Hamaguchi ........... G06F 3/0416
345/174

(Continued)

FOREIGN PATENT DOCUMENTS

JP          200534240      *  5/2005
JP          2015-032234 A     2/2015

*Primary Examiner* — Roy P Rabindranath
(74) *Attorney, Agent, or Firm* — ScienBiziP, P.C.

(57) ABSTRACT

The present disclosure detects capacitance distribution between each of detection electrodes and a detected subject on a touch panel with a simple configuration. A drive sense switch element selected among a plurality of drive sense switch elements (DST) on the basis of a code sequence via control lines turns on, and drive sense lines are driven at a first potential. A difference between linear sum signals based on an electric charge of each of the detection electrodes is then read. Subsequently, a capacitance or a change in capacitance between each of the detection electrodes of a touch panel and a detected subject is detected on the basis of a sum-of-product computation performed on the difference between the linear sum signals and the code sequence.

13 Claims, 10 Drawing Sheets

(56) References Cited

U.S. PATENT DOCUMENTS

2014/0132562 A1* 5/2014 Miyamoto ............ G06F 3/0418
345/174
2016/0110022 A1* 4/2016 Kanazawa .............. G06F 3/044
345/174

* cited by examiner

| | phase0 | phase1 |
|---|---|---|
| AFE0 | DS1 – DS0 | DS2 – DS1 |
| AFE1 | DS3 – DS2 | DS4 – DS3 |
| AFE2 | DS5 – DS4 | DS6 – DS5 |
| AFE3 | DS7 – DS6 | DS8 – DS7 |
| AFE4 | DS9 – DS8 | DS10 – DS9 |
| AFE5 | DS11 – DS10 | DS12 – DS11 |
| AFE6 | DS13 – DS12 | DS14 – DS13 |
| AFE7 | DS15 – DS14 | DS16 – DS15 |
| AFE8 | DS17 – DS16 | DS18 – DS17 |
| AFE9 | DS19 – DS18 | DS20 – DS19 |
| AFE10 | DS21 – DS20 | DS22 – DS21 |
| AFE11 | DS23 – DS22 | DS24 – DS23 |
| AFE12 | DS25 – DS24 | DS26 – DS25 |
| AFE13 | DS27 – DS26 | DS28 – DS27 |
| AFE14 | DS29 – DS28 | DS30 – DS29 |
| AFE15 | DS31 – DS30 | |

FIG. 3B

| | phase0 | phase1 |
|---|---|---|
| AFE0 | DS2 – DS0 | DS4 – DS2 |
| AFE1 | DS3 – DS1 | DS5 – DS3 |
| AFE2 | DS6 – DS4 | DS8 – DS6 |
| AFE3 | DS7 – DS5 | DS9 – DS7 |
| AFE4 | DS10 – DS8 | DS12 – DS10 |
| AFE5 | DS11 – DS9 | DS13 – DS11 |
| AFE6 | DS14 – DS12 | DS16 – DS14 |
| AFE7 | DS15 – DS13 | DS17 – DS15 |
| AFE8 | DS18 – DS16 | DS20 – DS18 |
| AFE9 | DS19 – DS17 | DS21 – DS19 |
| AFE10 | DS22 – DS20 | DS24 – DS22 |
| AFE11 | DS23 – DS21 | DS25 – DS23 |
| AFE12 | DS26 – DS24 | DS28 – DS26 |
| AFE13 | DS27 – DS25 | DS29 – DS27 |
| AFE14 | DS30 – DS28 | |
| AFE15 | DS31 – DS29 | |

FIG. 3C

| | phase0 | phase1 |
|---|---|---|
| AFE0 | DS4 – DS0 | DS8 – DS4 |
| AFE1 | DS5 – DS1 | DS9 – DS5 |
| AFE2 | DS6 – DS2 | DS10 – DS6 |
| AFE3 | DS7 – DS3 | DS11 – DS7 |
| AFE4 | DS12 – DS8 | DS16 – DS12 |
| AFE5 | DS13 – DS9 | DS17 – DS13 |
| AFE6 | DS14 – DS10 | DS18 – DS14 |
| AFE7 | DS15 – DS11 | DS19 – DS15 |
| AFE8 | DS20 – DS16 | DS24 – DS20 |
| AFE9 | DS21 – DS17 | DS25 – DS21 |
| AFE10 | DS22 – DS18 | DS26 – DS22 |
| AFE11 | DS23 – DS19 | DS27 – DS23 |
| AFE12 | DS28 – DS24 | |
| AFE13 | DS29 – DS25 | |
| AFE14 | DS30 – DS26 | |
| AFE15 | DS31 – DS27 | |

| | phase0 | phase1 |
|---|---|---|
| AFE0 | ( DS3+DS2 ) − ( DS1+DS0 ) | ( DS5+DS4 ) − ( DS3+DS2 ) |
| AFE1 | ( DS7+DS6 ) − ( DS5+DS4 ) | ( DS9+DS8 ) − ( DS7+DS6 ) |
| AFE2 | (DS11+DS10) − ( DS9+DS8 ) | (DS13+DS12) − (DS11+DS10) |
| AFE3 | (DS15+DS14) − (DS13+DS12) | (DS17+DS16) − (DS15+DS14) |
| AFE4 | (DS19+DS18) − (DS17+DS16) | (DS21+DS20) − (DS19+DS18) |
| AFE5 | (DS23+DS22) − (DS21+DS20) | (DS25+DS24) − (DS23+DS22) |
| AFE6 | (DS27+DS26) − (DS25+DS24) | (DS29+DS28) − (DS27+DS26) |
| AFE7 | (DS31+DS30) − (DS29+DS28) | |

FIG. 7

CAPACITANCE DETECTION METHOD, POSITION DETECTION METHOD, TOUCH PANEL CONTROLLER, AND ELECTRONIC DEVICE

TECHNICAL FIELD

The disclosure relates to a capacitance detection method using a touch panel that detects a capacitance or a change in capacitance between each of a plurality of electrodes and a detected subject, a position detection method, a touch panel controller, and an electronic device.

BACKGROUND ART

PTL 1 discloses a capacitance detection method using a touch panel that detects a capacitance or a change in capacitance between each of a plurality of electrodes and a detected subject.

FIG. 11 is a circuit diagram illustrating a configuration of a known touch panel system. A touch panel 92 includes 12 detection electrodes E arranged in four rows and three columns in matrix with an interval between each other. A sense line S coupled to each of the detection electrodes E is connected to a read circuit 95.

In a capacitance detection method using the touch panel 92 formed as described above, a signal corresponding to an electrostatic capacity between each of the detection electrodes E and a detected subject passes through the corresponding sense line S and is read by the read circuit 95. Then, distribution of the electrostatic capacity or a change in electrostatic capacity on the touch panel 92 is detected.

CITATION LIST

Patent Literature

PTL 1: JP 2015-32234 A (published Feb. 16, 2015).

SUMMARY

Technical Problem

However, the above-mentioned related art illustrated in FIG. 11 needs to install the sense line S from each of all the detection electrodes E of the touch panel 92 to the read circuit 95 in order to detect distribution of an electrostatic capacity or a change in electrostatic capacity on the touch panel 92. Thus, in view of upsizing of the touch panel, a wiring line resistance of the sense line S increases, and the number of channels (the number of sense lines S) of the read circuit 95 increases in proportion to a result of multiplying the number of rows by the number of columns of the detection electrodes E. This leads to a complicated configuration of a touch panel system.

An object of the disclosure is to provide a capacitance detection method capable of detecting capacitance distribution between each of detection electrodes and a detected subject on a touch panel with a simple configuration, a position detection method, a touch panel controller, and an electronic device.

Solution to Problem

To solve the above-described problems, a capacitance detection method according to one aspect of the disclosure is a capacitance detection method for detecting a capacitance or a change in capacitance between each of a plurality of electrodes arranged in matrix and a detected subject. The capacitance detection method includes: a first drive step of turning on a switch element selected among a plurality of switch elements between the electrodes and a plurality of signal lines aligned in a first direction of the matrix on the basis of a code sequence via a plurality of control lines aligned in a second direction intersecting the first direction and driving the plurality of signal lines at a first potential; a read step of turning on all of the plurality of switch elements and reading a linear sum signal based on an electric charge of each of the electrodes along each of the signal lines after the first drive step; and a detection step of detecting the capacitance or a change in capacitance by a sum-of-product computation performed on the linear sum signal and the code sequence.

A position detection method according to one aspect of the disclosure is a position detection method for detecting, on a touch panel configured to detect a capacitance or a change in capacitance between a plurality of electrodes arranged in matrix and a detected subject, a position of the detected subject. The position detection method includes the above-described capacitance detection method, and a position detection step of detecting a position of the detected subject on the touch panel, based on the capacitance or the change in capacitance detected in the detection step.

A touch panel controller according to one aspect of the disclosure is a touch panel controller configured to control a touch panel configured to detect a capacitance or a change in capacitance between each of a plurality of electrodes arranged in matrix and a detected subject. The touch panel controller includes: a drive circuit configured to turn on a switch element selected among a plurality of switch elements between the electrodes and a plurality of signal lines aligned in a first direction of the matrix, based on a code sequence via a plurality of control lines aligned in a second direction intersecting the first direction and drive the plurality of signal lines at a first potential; a read circuit configured to turn on all of the plurality of switch elements and read a linear sum signal based on an electric charge of each of the electrodes along each of the signal lines; and a detection circuit configured to detect the capacitance or a change in capacitance by a sum-of-product computation performed on the linear sum signal and the code sequence.

An electronic device according to one aspect of the disclosure includes the above-described touch panel controller.

Advantageous Effects of Disclosure

According to each of the aspects of the disclosure, an effect capable of detecting capacitance distribution between each of detection electrodes and a detected subject on a touch panel with a simple configuration is achieved.

BRIEF DESCRIPTION OF DRAWINGS

FIGS. 2A and 2B illustrate an example of a drive code of a drive circuit of a touch panel controller provided in the touch panel system. FIG. 2A illustrates an example of a drive code driving at two values of +1/−1 and a decoding code. FIG. 2B illustrates an example of a drive code driving at only +1 and a decoding code.

FIGS. 3A to 3C are diagrams for describing a method for reading a difference between a linear sum signal along one of drive sense lines of a touch panel provided in the touch panel system and a linear sum signal along another one of the drive sense lines. FIG. 3A illustrates an example of reading a difference between the drive sense lines adjacent to each other (next to each other). FIG. 3B illustrates an example of reading a difference between the drive sense lines with one line therebetween. FIG. 3C illustrates an example of reading a difference between the drive sense lines with three lines therebetween.

FIG. 7 is a diagram illustrating an example of a drive code of a drive circuit of a touch panel controller provided in the touch panel system.

DESCRIPTION OF EMBODIMENTS

A detailed description follows regarding embodiments of the disclosure.

First Embodiment

Configuration of Touch Panel System 1

Figure 1:
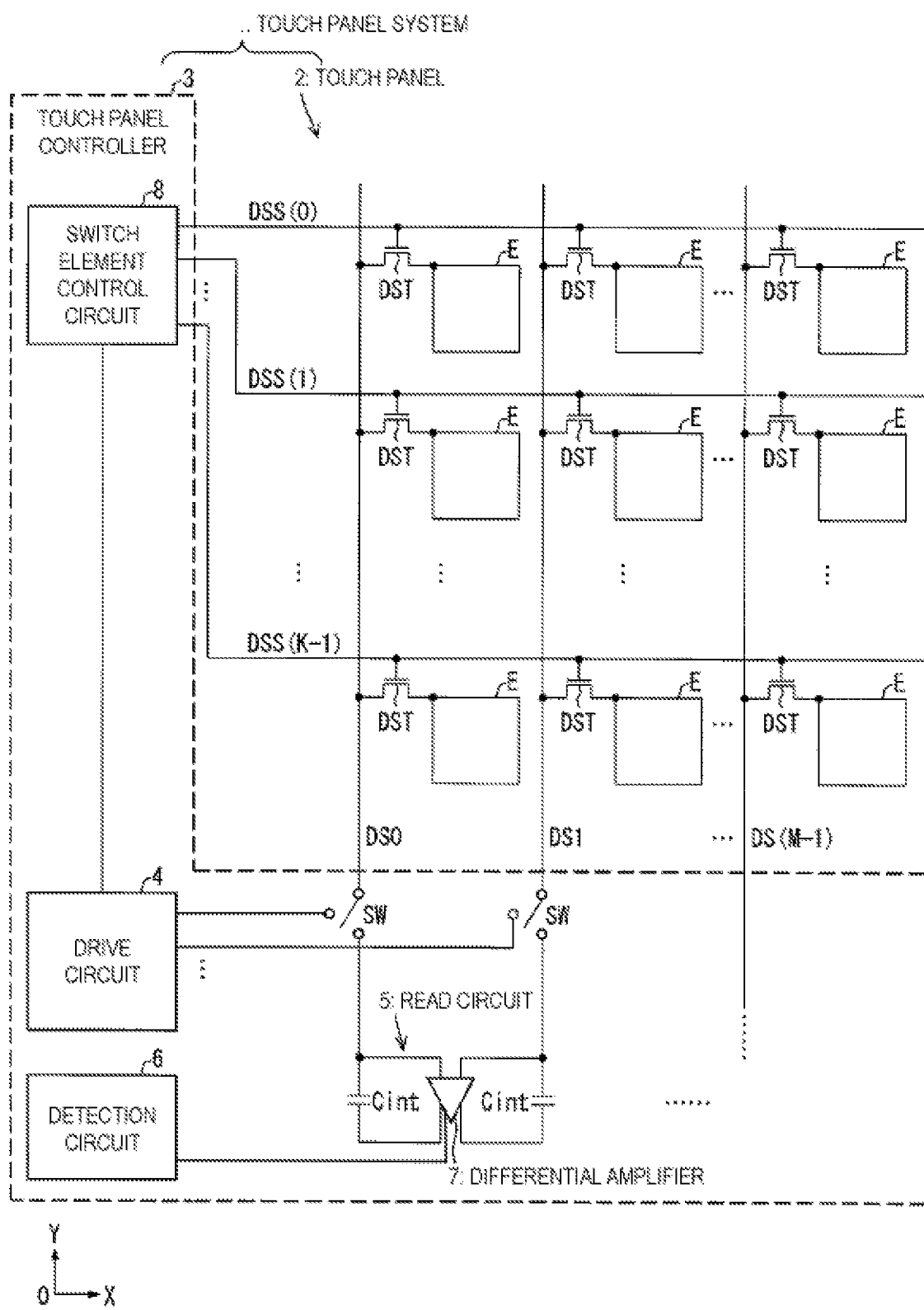
FIG. 1 is a circuit diagram illustrating a configuration of a touch panel system according to a first embodiment.

FIG. 1 is a circuit diagram illustrating a configuration of a touch panel system 1 according to a first embodiment. The touch panel system 1 includes a touch panel 2 and a touch panel controller 3 that controls the touch panel 2.

The touch panel 2 includes K (where K is plural) control lines DSS(0) to DSS(K−1) (control lines) and M (where M is plural) drive sense lines DS0 to DS(M−1) (signal lines) intersecting each other. The touch panel 2 also includes (K×M) detection electrodes E (electrodes) that correspond to intersections of the K control lines DSS(0) to DSS(K−1) and the M drive sense lines DS0 to DS(M−1) and that are arranged in matrix.

A drive sense switch element DST (switch element) is formed between each of the detection electrodes E and the corresponding drive sense line. The drive sense switch element DST is formed of a transistor. A gate of each of the drive sense switch elements DST is coupled to the corresponding control line.

The touch panel 2 is provided for detecting a capacitance or a change in capacitance between each of the detection electrodes E and a detected subject such as a finger and a pen.

The touch panel controller 3 includes a drive circuit 4 connected to the M drive sense lines DS0 to DS(M−1) via switching switches SW, a switch element control circuit 8 connected to the K control lines DSS(0) to DSS(K−1), a plurality of read circuits 5 connected to the drive sense lines adjacent to each other, and a detection circuit 6 that detects a capacitance or a change in capacitance between each of the detection electrodes E and the detected subject on the basis of an output of each of the read circuits 5.

Each of the read circuits 5 includes a differential amplifier 7 that amplifies a difference between outputs of the drive sense lines adjacent to each other and a pair of integral capacitances Cint provided between one input and one output of the differential amplifier 7 and between another input and another output thereof. Note that each of the read circuits 5 may include a switch that short-circuits one terminal and the other terminal of the integral capacitances Cint and resets a state of the differential amplifier 7 (not illustrated).

Action of Touch Panel System 1

The touch panel system 1 formed as described above works as follows.

First, the switch element control circuit 8 turns on the drive sense switch element DST selected among the (K×M) drive sense switch elements DST on the basis of a factor "1" of a code sequence of K rows and N columns via the K control lines DSS(0) to DSS(K−1). At this time, the drive sense switch elements DST that are not selected are off. The switching switches SW also switch in such a way to connect the drive circuit 4 and the M drive sense lines DS0 to DS(M−1). Then, the drive circuit 4 drives the M drive sense lines DS0 to DS(M−1) and charges each of the detection electrodes E with +V (for example, power source voltage) through the selected drive sense switch element DST (first drive step).

Next, the switch element control circuit 8 turns on the drive sense switch element DST selected among the (K×M) drive sense switch elements DST on the basis of a factor "−1" of the code sequence of K rows and N columns via the K control lines DSS(0) to DSS(K−1). At this time, the drive sense switch elements DST that are not selected are off. Herein, the switching switches SW also switch in such a way to connect the drive circuit 4 and the M drive sense lines DS0 to DS(M−1). Then, the drive circuit 4 drives the M drive sense lines DS0 to DS(M−1) and charges each of the detection electrodes E with −V (for example, ground voltage) through the selected drive sense switch element DST (second drive step).

Next, the switch element control circuit 8 turns off the (K×M) drive sense switch elements DST via the K control lines DSS(0) to DSS(K−1) and brings each of the detection electrodes E into a floating state. The switching switches SW also switch in such a way to connect the read circuits 5 and the M drive sense lines DS0 to DS(M−1). Subsequently, the switch element control circuit 8 turns on the (K×M) drive sense switch elements DST via the K control lines DSS(0) to DSS(K−1).

Each of the read circuits 5 amplifies a difference between linear sum signals based on an electric charge of each of the detection electrodes E read along the adjacent drive sense line via the drive sense switch element DST turning on (read step). Next, the detection circuit 6 detects a capacitance or a change in capacitance between each of the detection electrodes E of the touch panel 2 and a detected subject on the basis of a sum-of-product computation performed on the difference between the linear sum signals output from each of the read circuits 5 and the code sequence. Subsequently, the detection circuit 6 detects a position of the detected subject on the touch panel 2 on the basis of the detected capacitance or the detected change in capacitance (detection step).

Figure 11:
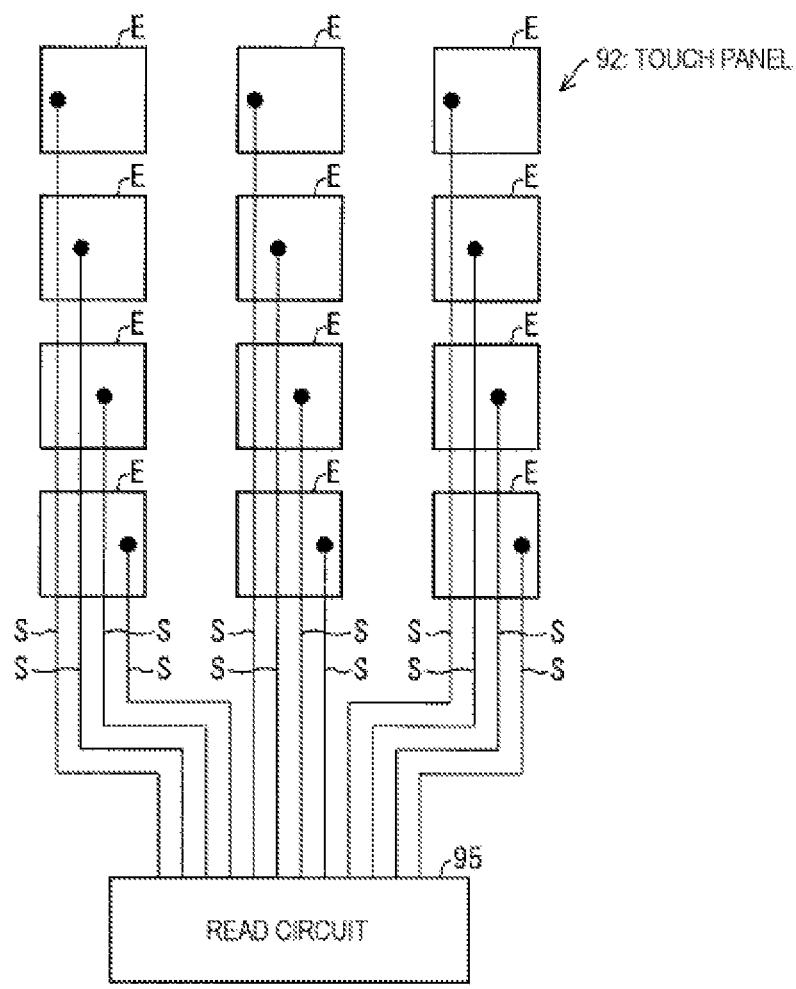
FIG. 11 is a circuit diagram illustrating a configuration of a known touch panel system.

In the known touch panel 92 described above with reference to FIG. 11, the number of channels (the number of sense lines 5) of the read circuit 95 is massive, so that in sequential drive, the greater number of sense lines S increases time required for scanning or the same scanning time reduces the number of sense lines S that can be scanned. However, in a case where the touch panel 2 in which each of the detection electrodes E is provided with the drive sense switch element DST and the switching switch SW as in the first embodiment is driven in parallel, the touch panel can be scanned in a short time with a simple configuration.

In a case where the touch panel 2 is driven in parallel, it is also more advantageous in terms of an S/N ratio than the sequential drive.

In recent years, a reduction in size of a liquid crystal module typified by a structure, which is called in-cell, including a sensor of a touch panel formed inside a display panel has been advancing, and a distance between a liquid crystal panel and the touch panel has been reduced. Thus, an influence of noise by the touch panel on the liquid crystal panel has not been negligible, and a need to drive the touch panel and the liquid crystal panel in a time-division manner has been increasing. Consequently, drive time assigned to the touch panel is limited, so that driving the touch panel in parallel is more advantageous than the sequential drive.

For the in-cell, the touch panel and the liquid crystal panel are integrally produced in the step of producing the liquid crystal panel, and thus the drive sense switch element DST of the touch panel 2 is easily installed in the touch panel 2. In other words, the transistor forming the drive sense switch element DST can be produced with the same mask as a mask for the liquid crystal panel, so that an increase in cost of an initial investment is reduced even in a case where the drive sense switch element DST is provided in the touch panel.

Furthermore, the plurality of detection electrodes E arranged in matrix in the touch panel 2 may also be used as common electrodes of the liquid crystal panel. When the touch panel and the liquid crystal panel are driven in the time-division manner, a voltage for driving the touch panel is applied to the plurality of detection electrodes E in a drive period assigned to the touch panel, and the detection electrodes E function as electrodes for driving the liquid crystal panel in a drive period assigned to the liquid crystal panel.

Specific Example of Code Sequence

Figures 2A, 2B:
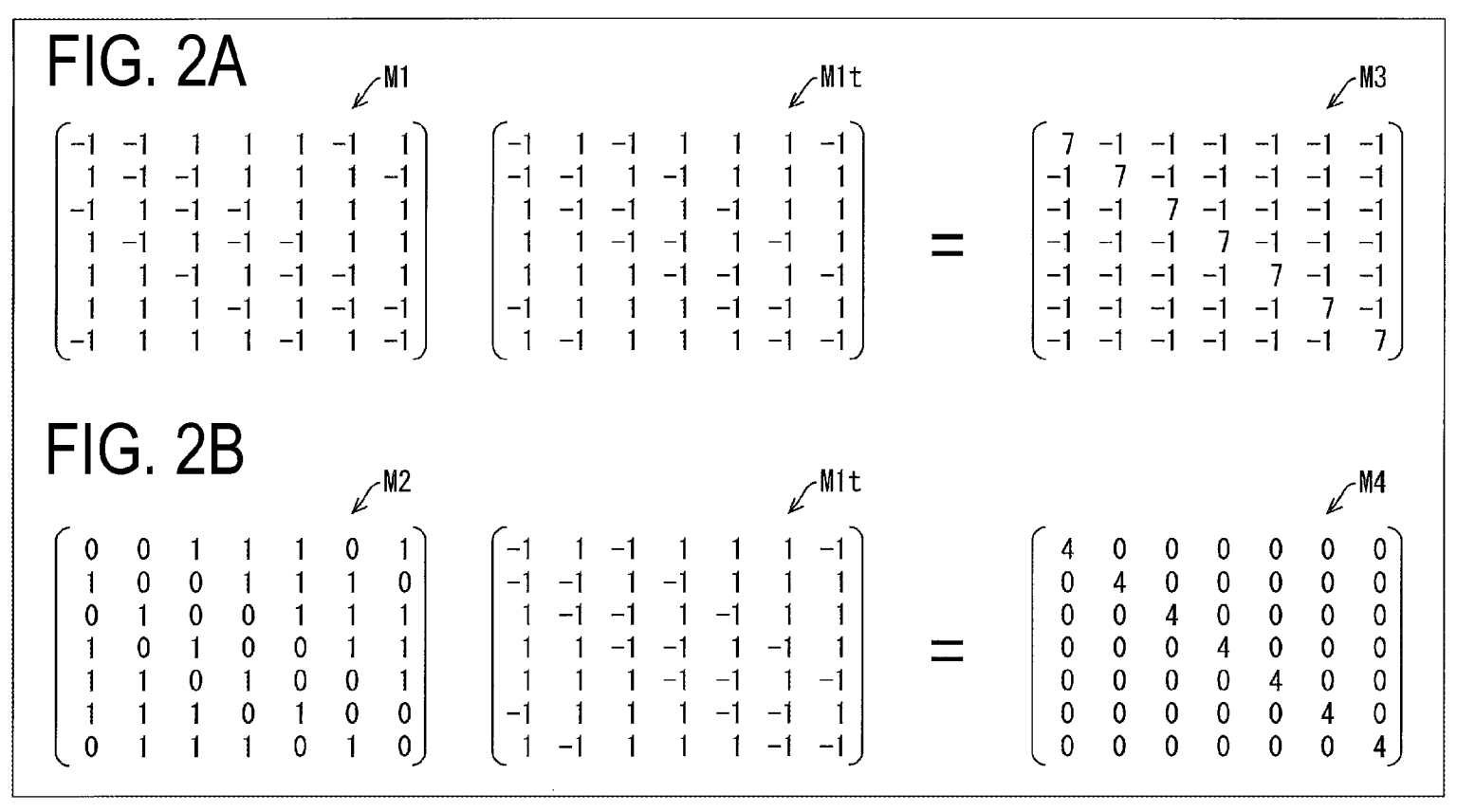

FIGS. 2A and 2B illustrate an example of a drive code (code sequence) of the drive circuit 4 of the touch panel controller 3 provided in the touch panel system 1. FIG. 2A illustrates an example of a drive code driving at two values of +1/−1 and a decoding code. FIG. 2B illustrates an example of a drive code driving at only +1 and a decoding code.

With reference to FIG. 2A, a code sequence M1 of an M sequence for driving seven control lines DSS(0) to DSS(K−1) at two values of "+1" and "−1" by the switch element control circuit 8, a code sequence M1$t$ used for a sum-of-product computation with a linear sum signal for decoding the detection circuit 6 and formed by transposing the code sequence M1, and a code sequence M3 being a result of the sum-of-product computation performed on the code sequence M1 and the code sequence M1$t$ are illustrated.

With reference to FIG. 2B, a code sequence M2 for driving control lines DSS(0) to DSS(6) at only "+1" by the switch element control circuit 8, the code sequence M1$t$ used for a sum-of-product computation with a linear sum signal for decoding in the detection circuit 6 and formed by transposing the code sequence M1, and a code sequence M4 being a result of the sum-of-product computation performed on the code sequence M2 and the code sequence MIA are illustrated.

Specific Example of Differential Reading

FIGS. 3A to 3C are diagrams for describing a method for reading a difference between a linear sum signal along one of the drive sense lines of the touch panel 2 provided in the touch panel system 1 and a linear sum signal along another one of the drive sense lines. FIG. 3A illustrates an example of reading a difference between the drive sense lines adjacent to each other (next to each other). FIG. 3B illustrates an example of reading a difference between the drive sense lines with one line therebetween. FIG. 3C illustrates an example of reading a difference between the drive sense lines with three lines therebetween.

With reference to FIG. 3A, an example of reading 32 drive sense lines DS0 to DS31 by 16 read circuits AFE0 to AFE15 is illustrated. The read circuits AFE0 to AFE15 each have the same configuration as that of the read circuit 5.

First, at a timing phase 0, the read circuit AFE0 amplifies a difference between a linear sum signal from the drive sense line DS1 and a linear sum signal from the drive sense line DS0. Then, the read circuit AFE1 amplifies a difference between the drive sense line DS3 and the drive sense line DS2, and the read circuit AFE2 amplifies a difference between the drive sense line DS5 and the drive sense line DS4. Hereinafter, the read circuits AFE3 to AFE15 similarly amplify a difference between the adjacent drive sense lines.

At a next timing phase 1, the read circuit AFE0 amplifies a difference between the drive sense line DS2 and the drive sense line DS1. Then, the read circuit AFE1 amplifies a difference between the drive sense line DS4 and the drive sense line DS3, and the read circuit AFE2 amplifies a difference between the drive sense line DS6 and the drive sense line DS5. Hereinafter, the read circuits AFE3 to AFE14 similarly amplify a difference between the adjacent drive sense lines.

In the example illustrated in FIGS. 1 and 3A, the example in which the read circuit differentially amplifies the adjacent drive sense lines is illustrated. However, the disclosure is not limited thereto. The sense lines that are not adjacent to each other with a plurality of lines therebetween may be differentially amplified.

FIG. 3B illustrates an example of reading a difference between the drive sense lines with one line therebetween.

First, at a timing phase 0, the read circuit AFE0 amplifies a difference between the drive sense line DS2 and the drive sense line DS0. Then, the read circuit AFE1 amplifies a difference between the drive sense line DS3 and the drive sense line DS1, and the read circuit AFE2 amplifies a difference between the drive sense line DS6 and the drive sense line DS4. Hereinafter, the read circuits AFE3 to AFE15 similarly amplify a difference between the drive sense lines with one line therebetween.

At a next timing phase 1, the read circuit AFE0 amplifies a difference between the drive sense line DS4 and the drive sense line DS2. Then, the read circuit AFE1 amplifies a difference between the drive sense line DS5 and the drive sense line DS3, and the read circuit AFE2 amplifies a difference between the drive sense line DS8 and the drive sense line DS6. Hereinafter, the read circuits AFE3 to AFE13 similarly amplify a difference between the drive sense lines with one line therebetween.

FIG. 3C illustrates an example of reading a difference between the drive sense lines with three lines therebetween.

First, at a timing phase 0, the read circuit AFE0 amplifies a difference between the drive sense line DS4 and the drive sense line DS0. Then, the read circuit AFE1 amplifies a difference between the drive sense line DS5 and the drive sense line DS1, and the read circuit AFE2 amplifies a difference between the drive sense line DS6 and the drive sense line DS2. Hereinafter, the read circuits AFE3 to AFE15 similarly amplify a difference between the drive sense lines with three lines therebetween.

At a next timing phase 1, the read circuit AFE0 amplifies a difference between the drive sense line DS8 and the drive sense line DS4. Then, the read circuit AFE1 amplifies a difference between the drive sense line DS9 and the drive sense line DSS, and the read circuit AFE2 amplifies a difference between the drive sense line DS10 and the drive sense line DS6. Hereinafter, the read circuits AFE3 to AFE11 similarly amplify a difference between the drive sense lines with three lines therebetween.

By such differential reading that reads a difference between the drive sense lines, noise on one of the drive sense lines and noise on the other drive sense line can cancel each other by subtraction, so that the touch panel system resistant to noise can be formed.

A difference is read between the drive sense lines in the differential reading, which results in a decreased value of a read signal. Thus, the differential reading is advantageous in that a gain of the differential amplifier 7 can be increased more than a gain in a case of single reading.

Figures 4, 5:
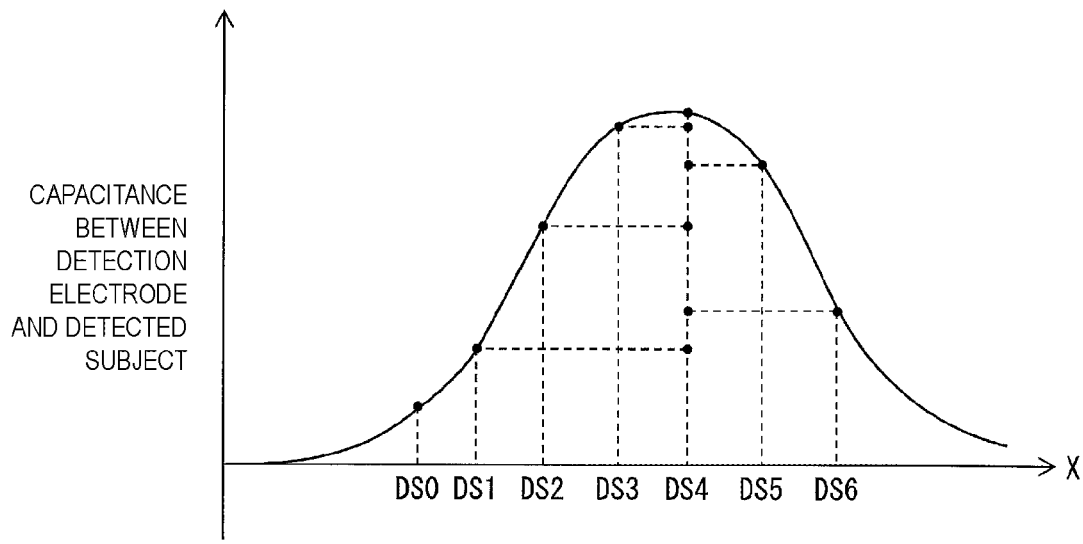
FIG. 4 is a graph showing capacitance distribution between a detection electrode corresponding to each of the drive sense lines and a detected subject.
FIG. 5 is a diagram for describing a method for reading a difference between a linear sum signal based on a group including the plurality of drive sense lines and another linear sum signal based on another group including the other plurality of drive sense lines.

FIG. 4 is a graph showing capacitance distribution between the detection electrode E corresponding to each of the drive sense lines and a detected subject.

In a hover operation operated by a detected subject such as a finger slightly away from the touch panel 2, distribution of a capacitance between the detection electrode E and the detected subject in a plane direction of the touch panel 2 is distribution as shown in FIG. 4.

A signal in which a difference between linear sum signals from the adjacent drive sense lines is amplified has a small value, but an obtained value of the differential signal can be increased as shown in FIG. 4 by positioning the drive sense lines having a difference amplified away from each other as illustrated in FIGS. 3B and 3C.

FIG. 5 is a diagram for describing a method for reading a difference between a linear sum signal based on a group including the plurality of drive sense lines and another linear sum signal based on another group including the other plurality of drive sense lines.

The above-mentioned embodiment illustrates the example of reading a difference between the linear sum signal along one of the drive sense lines and the other linear sum signal along the other drive sense line. However, the disclosure is not limited thereto. A difference may be read between a linear sum signal based on a group including the plurality of drive sense lines and another linear sum signal based on another group including the other plurality of drive sense lines.

FIG. 5 illustrates an example of making a group of a $(2n)^{th}$ drive sense line and a $(2n+1)^{th}$ drive sense line and reading a difference between grouped drive sense line groups.

First, at a timing phase 0, the drive sense lines DS3 and DS2 are formed into a group, and the drive sense lines DS1 and DS0 are formed into a group. Then, the read circuit AFE0 amplifies a difference between a sum of a linear sum signal from the drive sense line DS3 and a linear sum signal from the drive sense line DS2 and a sum of a linear sum signal from the drive sense line DS1 and a linear sum signal from the drive sense line DS0. The drive sense lines DS7 and DS6 are formed into a group, and the drive sense lines DS5 and DS4 are formed into a group. Then, the read circuit AFE1 amplifies a difference between a sum of a linear sum signal from the drive sense line DS7 and a linear sum signal from the drive sense line DS6 and a sum of a linear sum signal from the drive sense line DS5 and a linear sum signal from the drive sense line DS4. The drive sense lines DS11 and DS10 are formed into a group, and the drive sense lines DS9 and DS8 are formed into a group. Then, the read circuit AFE2 amplifies a difference between a sum of the drive sense line DS11 and the drive sense line DS10 and a sum of the drive sense line DS9 and the drive sense line DS8. Hereinafter, the read circuits AFE3 to AFE7 similarly amplify a difference between the grouped drive sense line groups.

At a next timing phase 1, the drive sense lines DS5 and DS4 are formed into a group, and the drive sense lines DS3 and DS2 are formed into a group. Then, the read circuit AFE0 amplifies a difference between a sum of a linear sum signal from the drive sense line DS5 and a linear sum signal from the drive sense line DS4 and a sum of a linear sum signal from the drive sense line DS3 and a linear sum signal from the drive sense line DS2. The drive sense lines DS9 and DS8 are formed into a group, and the drive sense lines DS7 and DS6 are formed into a group. Then, the read circuit AFE1 amplifies a difference between a sum of a linear sum signal from the drive sense line DS9 and a linear sum signal from the drive sense line DS8 and a sum of a linear sum signal from the drive sense line DS7 and a linear sum signal from the drive sense line DS6. The drive sense lines DS13 and DS12 are formed into a group, and the drive sense lines DS11 and DS10 are formed into a group. Then, the read circuit AFE2 amplifies a difference between a sum of the drive sense line DS13 and the drive sense line DS12 and a sum of the drive sense line DS11 and the drive sense line DS10. Hereinafter, the read circuits AFE3 to AFE6 similarly amplify a difference between the grouped drive sense line groups.

The differential reading reads a difference component between the drive sense lines, so that only a small signal can be acquired. However, as described above, the drive sense lines are brought together into a group and then read, so that a signal component read from the drive sense lines can be increased.

Note that the above-mentioned embodiment illustrates the example of turning on the drive sense switch elements DST via all the control lines DSS(0) to DSS(K−1) and driving the drive sense lines DS0 to DS(M−1), but the disclosure is not limited thereto. The switch element control circuit 8, the drive circuit 4, and the switching switches SW may form so as to turn on the drive sense switch elements DST for at least two of the control lines and drive the drive sense lines DS0 to DS(M−1).

Second Embodiment

Figure 6:
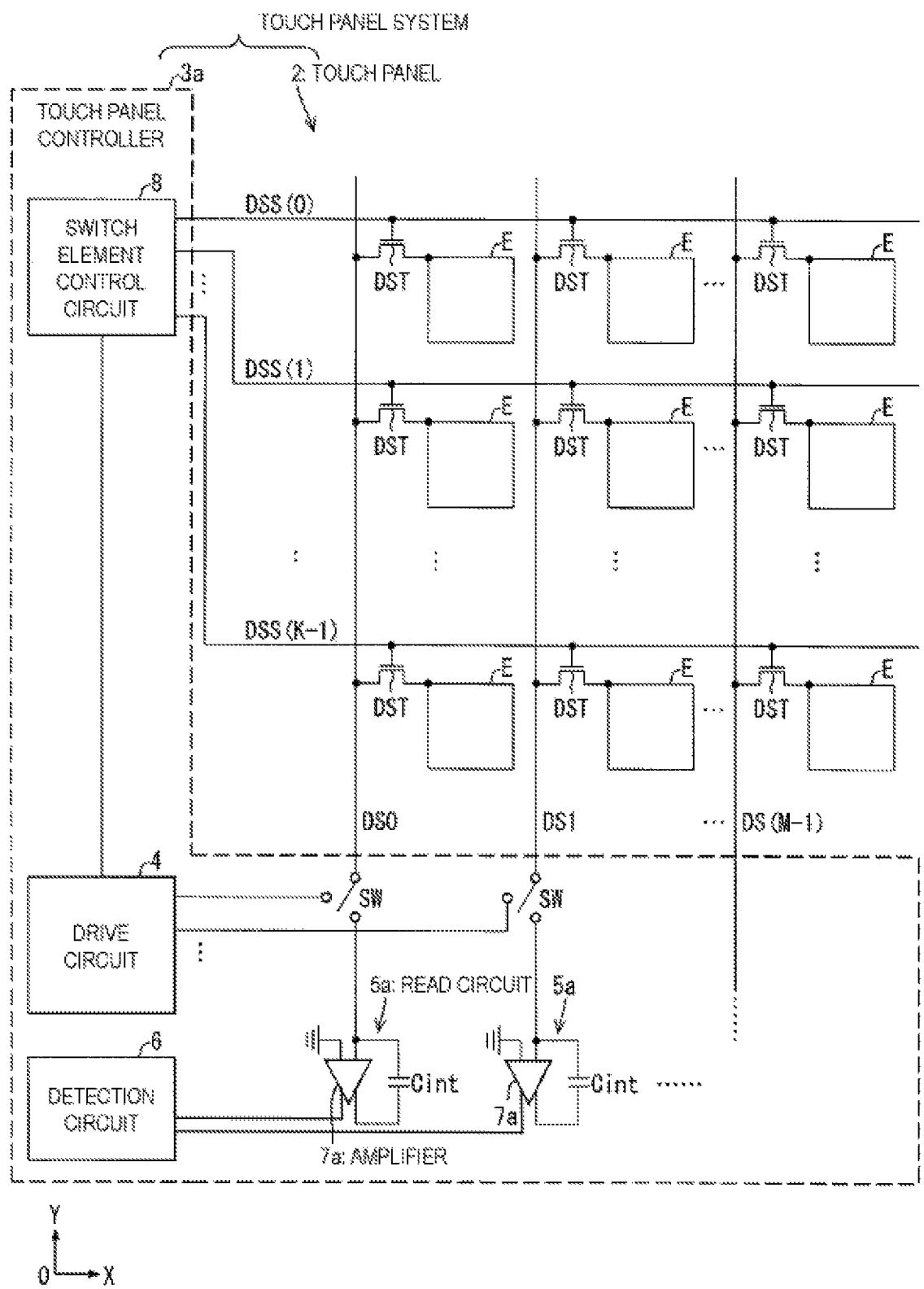
FIG. 6 is a circuit diagram illustrating a configuration of a touch panel system according to a second embodiment.
Figure 7:
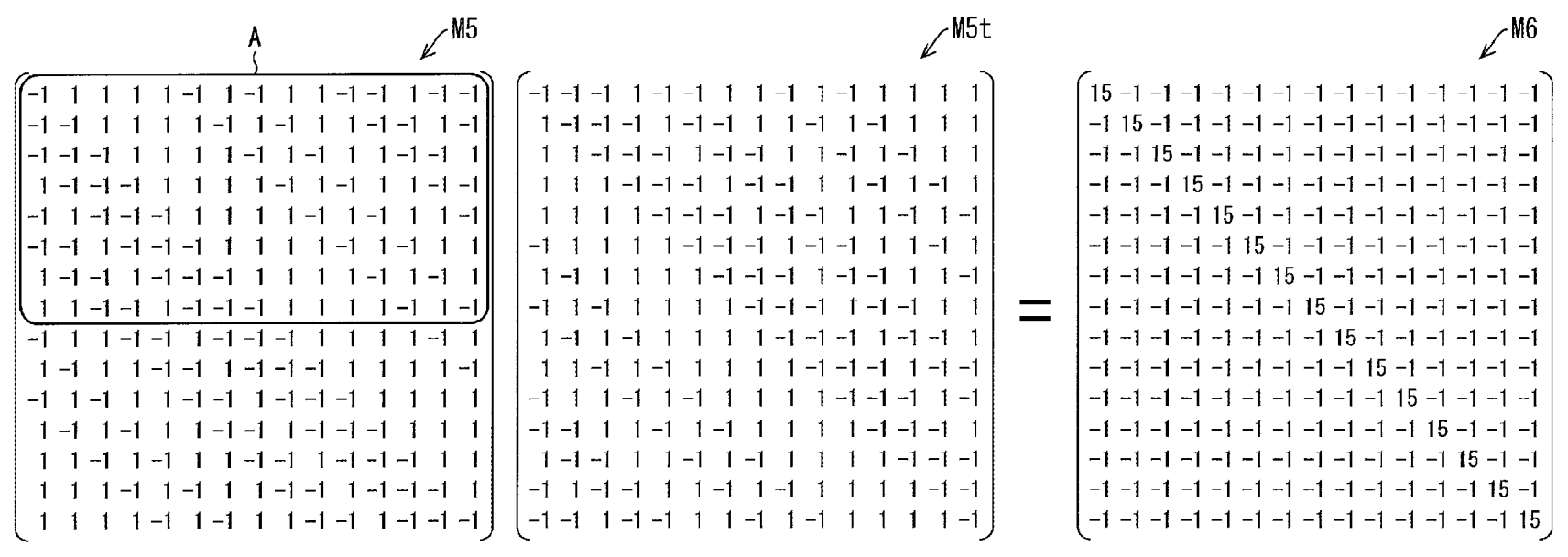

A description follows regarding another embodiment of the disclosure, with reference to FIGS. 6 to 8. Note that members having the same function as the members stated in the embodiment above are appended with the same reference signs for the sake of description, and the description thereof is omitted.

FIG. 6 is a circuit diagram illustrating a configuration of a touch panel system 1a according to a second embodiment. The touch panel system 1a performs single reading on a drive sense line.

The touch panel system 1a includes a touch panel 2 and a touch panel controller 3a that controls the touch panel 2. The touch panel controller 3a includes M read circuits 5a.

Each of M drive sense lines DS0 to DS(M−1) is connected to one of inputs of an amplifier 7a of the corresponding read circuit 5a. Another input of the amplifier 7a is AC grounded. An integral capacitance Cint is connected between the one input and an output of the amplifier 7a. Note that each of the read circuits 5a may include a switch that short-circuits one terminal and the other terminal of the integral capacitance Cint and resets a state of the amplifier 7a (not illustrated).

The single reading reads an absolute value of a capacitance instead of a difference component of a capacitance. Thus, the single reading is advantageous in that a value of a linear sum signal is greater than that in the differential reading, but the amplifier is more likely to be saturated.

FIG. 7 is a diagram illustrating an example of a drive code (code sequence) of a drive circuit 4 of the touch panel controller 3a provided in the touch panel system 1a.

FIG. 7 illustrates a code sequence M5 of 15 rows and 15 columns of an M sequence when driving at two values of a factor "+1" for allowing the drive circuit 4 to drive the drive sense line from a reference potential to a power source potential and a factor "−1" for allowing the drive circuit 4 to drive the drive sense line from a reference potential to a ground potential, a code sequence M5t used for a sum-of-product computation for decoding in a detection circuit 6 and formed by transposing the code sequence M5, and a code sequence M6 being a result of the sum-of-product computation performed on the code sequence M5 and the code sequence M5t.

Eight control lines are driven on the basis of a code sequence A of eight rows and 15 columns surrounded by a frame illustrated in FIG. 7 in the code sequence M5.

The number of the factor "1" is three and the number of the factor "−1" is five in a first column from the left in the code sequence A, and thus a difference between them in number is two. The number of the factor "1" is three and the number of the factor "−1" is five in a second column to a third column similarly from the left, and thus a difference between them in number is two. The number of the factor "1" is four and the number of the factor "−1" is four in a fourth column from the left, and thus there is no difference between them in number. The number of the factor "1" is six and the number of the factor "−1" is two in a ninth column to a tenth column from the left, and thus a difference between them in number is four.

In this way, a difference between the number of the factor "1" and the number of the factor "−1" in each of the columns in the code sequence A varies from zero to four and is unbalanced.

On the other hand, in the code sequence M1 of the M sequence of seven rows and seven columns described above with FIG. 2A, the number of the factor "1" is four and the number of the factor "−1" is three in each of the first column to the seventh column, and thus a difference between them in number is one. Therefore, the code sequence M1 always has mostly good balance between the number of the factor "1" and the number of the factor "−1". Note that the most balanced state is when the number of the factor "1" and the number of the factor "−1" are the same and a difference between them in number is zero.

Because the code sequence M1 has the seven rows and seven columns, all of the eight drive sense lines cannot be driven at the same time. However, in a case where the balance between the number of the factor "1" and the number of the factor "−1" in the code sequence is prioritized, there is such an option that the seven drive sense lines DS0 to DS6 are driven by the code sequence M1 at the first timing to obtain capacitance distribution corresponding to the drive sense lines DS0 to DS6, the seven drive sense lines DS1 to DS7 are then driven by the code sequence M1 at the next timing to obtain capacitance distribution corresponding to the drive sense lines DS1 to DS7, and both of the capacitance distributions are combined together to obtain capacitance distribution corresponding to the eight drive sense lines DS0 to DS7.

Figure 8A:
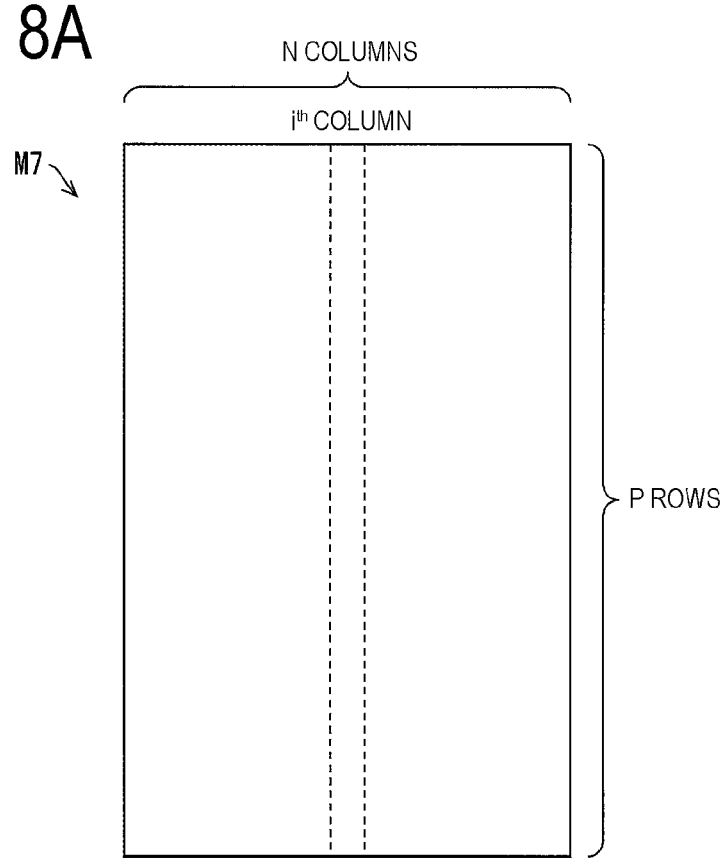
FIGS. 8A and 8B are diagrams illustrating an example of another drive code of the drive circuit.
Figure 8B:
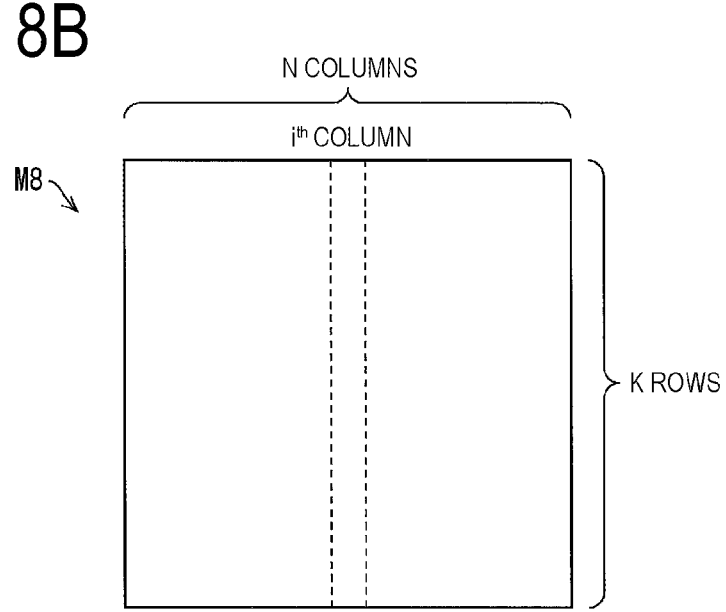

FIGS. 8A and 8B are diagrams illustrating an example of another drive code of the drive circuit.

A code sequence M8 includes K rows selected from P rows in a code sequence M7 of P rows and N columns including the factor "1" for driving the drive sense line from a reference potential to a power source potential and the factor "−1" for driving the sense line from a reference potential to a ground potential (K≤N, K≤P), and is balanced such that a difference between the number of the factor "1" and the number of the factor "−1" in an $i^{th}$ column (1≤i≤N) in the code sequence is brought closer to zero. On the basis of the code sequence M8, the switch element control circuit 8 drives K control lines DSS(0) to DSS(K−1). Also in this way, the control lines can be balanced and driven.

For example, when 16 control lines are driven, the 16 control lines are driven by using the code sequence M8 having 16 rows selected from the code sequence M7 of the M sequence of 64 rows and 64 columns such that a difference between the number of the factor "1" and the number of the factor "−1" in an $i^{th}$ column (1≤i≤N) is brought closer to zero and is balanced. Thus, the control lines can be balanced and driven.

Third Embodiment

Configuration of Touch Panel System 1b

Figure 9:
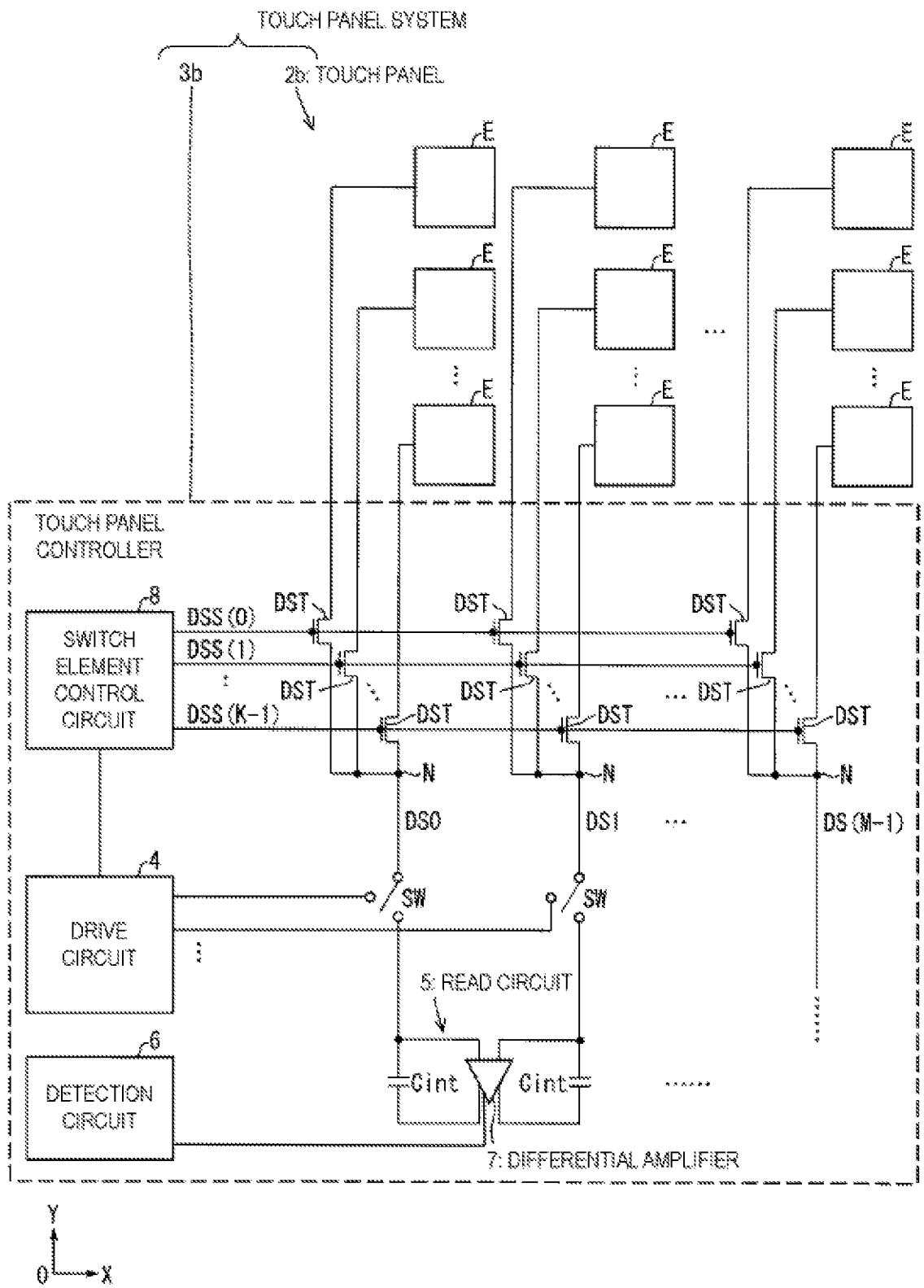
FIG. 9 is a circuit diagram illustrating a configuration of a touch panel system according to a third embodiment.

FIG. 9 is a circuit diagram illustrating a configuration of a touch panel system 1b according to a third embodiment of the disclosure. Members having the same function as the members stated in the embodiment above are appended with the same reference signs, and the description thereof is omitted. The touch panel system 1b includes a touch panel 2b and a touch panel controller 3b that controls the touch panel 2b.

The touch panel 2b includes (K×M) detection electrodes E (electrodes) arranged in matrix. Herein, an X-axis direction is a first direction of this matrix. A Y-axis direction is a second direction intersecting the first direction of this matrix.

The touch panel controller 3h includes a drive circuit 4 connected to M drive sense lines DS0 to DS(M−1) via switching switches SW, a switch element control circuit 8 connected to K control lines DSS(0) to DSS(K−1), a plurality of read circuits 5 connected to the drive sense lines adjacent to each other, a detection circuit 6 that detects a capacitance or a change in capacitance between each of the detection electrodes E and a detected subject on the basis of an output of each of the read circuits 5, and a drive sense switch element DST (switch element).

Each of the read circuits 5 includes a differential amplifier 7 that amplifies a difference between outputs of the drive sense lines adjacent to each other and a pair of integral capacitances Cint provided between one input and one output of the differential amplifier 7 and between another input and another output thereof. Note that each of the read circuits 5 may include a switch that short-circuits one terminal and the other terminal of the integral capacitances Cint and resets a state of the differential amplifier 7 (not illustrated).

The drive sense lines DS0 to DS(M−1) are aligned in the X-axis direction. The plurality of detection electrodes E aligned in one line in the Y direction are connected to a node N via the drive sense switch elements DST and connected to one corresponding drive sense line via the node N.

The control lines DSS(0) to DSS(K−1) are aligned in the Y direction. Gates of the plurality of drive sense switch elements DST connected to the plurality of detection electrodes E aligned in one line in the X direction are connected to one corresponding control line.

The touch panel 2b differs from the touch panel 2 in that the touch panel 2b does not include the switch element DST built therein. The touch panel controller 3b differs from the touch panel controllers 3, 3a in that the touch panel controller 3b includes the switch element DST built therein.

Action of Touch Panel System 1b

The touch panel system 1b formed as described above works as follows.

First, the switch element control circuit 8 turns on the drive sense switch element DST selected among the (K×M) drive sense switch elements DST on the basis of a factor "1" of a code sequence of K rows and N columns via the K control lines DSS(0) to DSS(K−1). At this time, the drive sense switch elements DST that are not selected are off. The switching switches SW also switch in such a way to connect the drive circuit 4 and the M drive sense lines DS0 to DS(M−1). Then, the drive circuit 4 drives the M drive sense lines DS0 to DS(M−1) and charges each of the detection electrodes E with +V (for example, power source voltage) through the selected drive sense switch element DST (first drive step).

Next, the switch element control circuit 8 turns on the drive sense switch element DST selected among the (K×M) drive sense switch elements DST on the basis of a factor "−1" of the code sequence of K rows and N columns via the K control lines DSS(0) to DSS(K−1). At this time, the drive sense switch elements DST that are not selected are off. Herein, the switching switches SW also switch in such a way to connect the drive circuit 4 and the M drive sense lines DS0 to DS(M−1). Then, the drive circuit 4 drives the M drive sense lines DS0 to DS(M−1) and charges each of the detection electrodes E with −V (for example, ground voltage) through the selected drive sense switch element DST (second drive step).

Next, the switch element control circuit 8 turns off the (K×M) drive sense switch elements DST via the K control lines DSS(0) to DSS(K−1) and brings each of the detection electrodes E into a floating state. The switching switches SW also switch in such a way to connect the read circuits 5 and the M drive sense lines DS0 to DS(M−1). Subsequently, the switch element control circuit 8 turns on the (K×M) drive sense switch elements DST via the K control lines DSS(0) to DSS(K−1).

Each of the read circuits 5 amplifies a difference between linear sum signals based on an electric charge of each of the detection electrodes E read along the adjacent drive sense line via the drive sense switch element DST turning on (read step). Next, the detection circuit 6 detects a capacitance or a change in capacitance between each of the detection electrodes E of the touch panel 2 and a detected subject on the basis of a sum-of-product computation performed on the difference between the linear sum signals output from each of the read circuits 5 and the code sequence. Subsequently, the detection circuit 6 detects a position of the detected subject on the touch panel 2 on the basis of the detected capacitance or the detected change in capacitance (detection step).

The touch panel controller 3b can detect capacitance distribution between each of the electrodes E and the detected subject on the touch panel 2b with a simple configuration even in the passive touch panel 2b that does not include the switch element DST built therein. Furthermore, the touch panel controller 3b is more advantageous than the touch panel controller in the known touch panel system illustrated in FIG. 11 in that the touch panel controller 3b can read a linear sum signal based on an electric charge of each of the detection electrodes E in parallel along a signal line.

Fourth Embodiment

Figure 10:
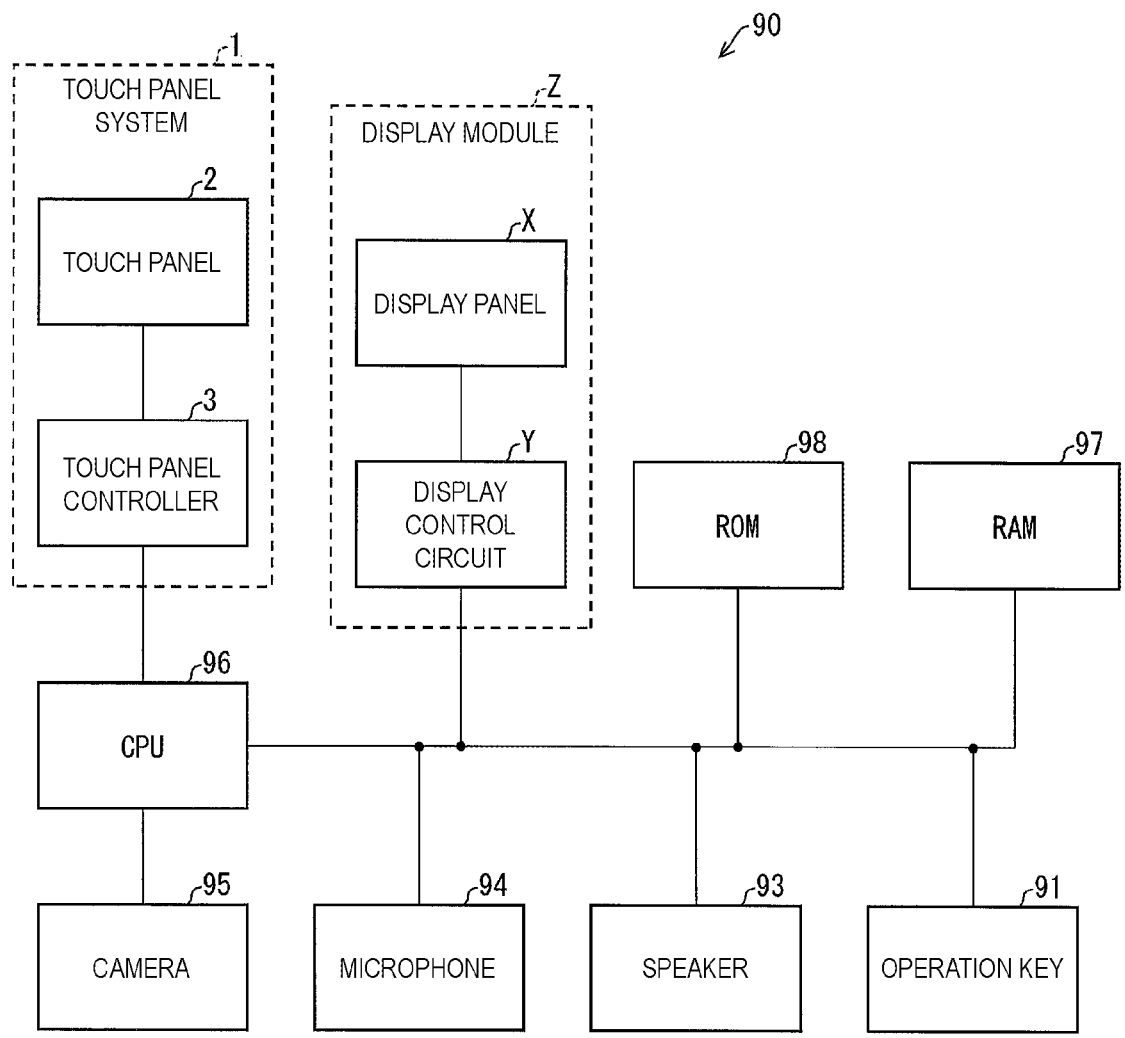
FIG. 10 is a block diagram illustrating a configuration of an electronic device according to a fourth embodiment.

FIG. 10 is a block diagram illustrating a configuration of a portable telephone 90 (electronic device) according to a fourth embodiment of the disclosure. Members having the same function as the members stated in the embodiment above are appended with the same reference signs for the sake of description, and the description thereof is omitted.

The portable telephone 90 includes a CPU 96, a RAM 97, a ROM 98, a camera 95, a microphone 94, a speaker 93, an operation key 91, a display module Z including a display panel X and a display control circuit Y, and a touch panel system 1. Each of the components is connected to one another with a data bus.

The CPU 96 controls action of the portable telephone 90. The CPU 96 executes a program stored in the ROM 98, for example. The operation key 91 receives an input of an instruction by a user of the portable telephone 90. The RAM 97 stores data generated by execution of a program by the CPU 96 or data input via the operation key 91 in a volatile manner. The ROM 98 stores data in a non-volatile manner.

The ROM 98 is a ROM that enables writing and erasing, such as an erasable programmable read-only memory (EPROM) and a flash memory. Note that the portable telephone 90 may include an interface (IF) for connection to another electronic device with a wire, which is not illustrated in FIG. 10.

The camera 95 captures an object in response to an operation of the operation key 91 by a user. Note that image data of the captured object is stored in the RAM 97 and an external memory (for example, a memory card). The microphone 94 receives an input of a voice of a user. The portable telephone 90 digitizes the input voice (analog data). The portable telephone 90 then transmits the digitized voice to the other end of communication (for example, another portable telephone). The speaker 93 outputs a sound based on music data stored in the RAM 97, for example.

The touch panel system 1 includes a touch panel 2 and a touch panel controller 3. The CPU 96 controls action of the touch panel system 1. The CPU 96 executes a program stored in the ROM 98, for example. The RAM 97 stores data generated by execution of a program by the CPU 96 in a volatile manner. The ROM 98 stores data in a non-volatile manner.

The display panel X displays an image stored in the ROM 98 and the RAM 97 by the display control circuit Y. The display panel X overlaps the touch panel 2 or includes the touch panel 2 built therein. The touch panel system 1 may be the touch panel system 1a according to the second embodiment or the touch panel system 1b according to the third embodiment.

Supplement

A capacitance detection method according to aspect 1 of the disclosure is a capacitance detection method for detecting a capacitance or a change in capacitance between each of a plurality of electrodes (detection electrodes E) arranged in matrix and a detected subject. The capacitance detection method includes: a first drive step of turning on a switch element selected among a plurality of switch elements (drive sense switch elements DST) between the electrodes and a plurality of signal lines (drive sense lines DS0 to DS(M−1)) aligned in a first direction of the matrix on the basis of a code sequence via a plurality of control lines (control lines DSS(0) to DSS(K−1)) aligned in a second direction intersecting the first direction and driving the plurality of signal lines at a first potential; a read step of turning on all of the plurality of switch elements and reading a linear sum signal based on an electric charge of each of the electrodes along each of the signal lines after the first drive step; and a detection step of detecting the capacitance or a change in capacitance by a sum-of-product computation performed on the linear sum signal and the code sequence.

According to the configuration above, the switch element selected among the plurality of switch elements turns on, and the plurality of signal lines are driven on the basis of the code sequence. Then, the plurality of switch elements turn on, and a linear sum signal based on an electric charge of each of the electrodes is read along each of the signal lines. As a result, capacitance distribution between each of detection electrodes and the detected subject on a touch panel can be detected with a simple configuration.

In the capacitance detection method according to aspect 2 of the disclosure, the plurality of electrodes and the plurality of switch elements are preferably formed in a touch panel.

In the capacitance detection method according to aspect 3 of the disclosure, the plurality of electrodes are preferably formed in a touch panel, and the plurality of switch elements are preferably formed in a touch panel controller configured to control the touch panel.

The capacitance detection method according to aspect 4 of the disclosure further includes a second drive step of turning on another switch element selected among the plurality of switch elements, based on the code sequence via the control lines and driving the plurality of signal lines at a second potential different from the first potential. The read step preferably turns on all of the plurality of switch elements and reads a linear sum signal based on an electric charge of each of the electrodes along each of the signal lines after the first and the second drive steps.

In the capacitance detection method according to aspect 5 of the disclosure in aspect 4, the switch element selected, based on a first value of a code sequence preferably turns on in the first drive step, and the switch element selected, based on a second value different from the first value of the code sequence preferably turns on in the second drive step.

The configuration above can drive the signal lines faster than those in a configuration in which a selected switch element sequentially turns on.

In the capacitance detection method according to aspect 6 of the disclosure in aspect 5, the first value is preferably a factor "1" for driving each of the signal lines from a reference potential to the first potential, the second value is preferably a factor "−1" for driving each of the signal lines from the reference potential or another reference potential to the second potential, and the code sequence is preferably a code sequence including the factor "1" and the factor "−1" and is preferably balanced such that a difference between the number of the factor "1" and the number of the factor "−1" in an $i^{th}$ column ($1 \le i \le N$) is brought closer to zero.

According to the configuration above, each potential driving the plurality of signal lines can be balanced as a whole.

In the capacitance detection method according to aspect 7 of the disclosure in aspect 5, the first value is preferably a factor "1" for driving each of the signal lines from a reference potential to the first potential, the second value is preferably a factor "−1" for driving each of the signal lines from the reference potential or another reference potential to the second potential, the plurality of control lines are preferably K control lines (K is plural), and the code sequence preferably includes K rows selected from P rows in another code sequence of P rows and N columns including the factor "1" and the factor "4" ($K \le N$, $K \le P$), and is preferably balanced such that a difference between the number of the factor "1" and the number of the factor "−1" in an $i^{th}$ column ($1 \le i \le N$) is brought closer to zero.

In the capacitance detection method according to aspect 8 of the disclosure in any one of aspects 1 to 7, a difference between a linear sum signal along one of the signal lines and another linear sum signal along another one of the signal lines is preferably read in the read step.

According to the configuration above, by differential reading that reads a difference between the signal lines, noise on one of the signal lines and noise on the other signal line can cancel each other by subtraction, so that a touch panel system resistant to noise can be formed.

In the capacitance detection method according to aspect 9 of the disclosure in any one of aspects 1 to 7, a difference between a linear sum signal based on a group including the plurality of signal lines and another linear sum signal based on another group including the other plurality of signal lines is preferably read in the read step.

According to the configuration above, the signal lines are brought together into a group and then read, so that a signal component read from the signal lines can be increased.

A position detection method according to aspect 10 of the disclosure is a position detection method for detecting, on a touch panel 2, 2b configured to detect a capacitance or a change in capacitance between a plurality of electrodes (detection electrodes E) arranged in matrix and a detected subject, a position of the detected subject. The position detection method includes the capacitance detection method in any one of aspects 1 to 9, and a position detection step of detecting a position of the detected subject on the touch panel on the basis of the capacitance or the change in capacitance detected in the detection step.

A touch panel controller 3, 3a, 3b according to aspect 11 of the disclosure is a touch panel controller configured to control a touch panel 2, 2b configured to detect a capacitance or a change in capacitance between each of a plurality of electrodes (detection electrodes E) arranged in matrix and a detected subject. The touch panel controller includes: a drive circuit configured to turn on a switch element selected among a plurality of switch elements (drive sense switch elements DST) between the electrodes and a plurality of signal lines (drive sense lines DS0 to DS(M−1)) aligned in a first direction of the matrix on the basis of a code sequence via a plurality of control lines (control lines DSS(0) to DSS(K−1)) aligned in a second direction intersecting the first direction and drive the plurality of signal lines at a first potential; a read circuit configured to turn on all of the plurality of switch elements and read a linear sum signal based on an electric charge of each of the electrodes along each of the signal lines; and a detection circuit configured to detect the capacitance or a change in capacitance by a sum-of-product computation performed on the linear sum signal and the code sequence.

In the touch panel controller according to aspect 12 of the disclosure in aspect 11, the plurality of electrodes (detection electrodes E) are preferably used as common electrodes of the liquid crystal panel.

The configuration above simplifies a configuration of an in-cell liquid crystal panel in which a touch panel is installed.

An electronic device (portable telephone 90) according to aspect 13 of the disclosure includes the touch panel controller 3, 3a, 3b in any one of aspects 11 and 12.

The disclosure is not limited to each of the embodiments stated above, and various modifications may be implemented within a range not departing from the scope of the claims. Embodiments obtained by appropriately combining technical approaches stated in each of the different embodiments also fall within the scope of the technology of the disclosure. Moreover, novel technical features may be formed by combining the technical approaches stated in each of the embodiments.

REFERENCE SIGNS LIST 1, 1a, 1b Touch panel system
2, 2b Touch panel
3, 3a, 3b Touch panel controller
4 Drive circuit
5, 5a Read circuit
6 Detection circuit
7 Differential amplifier
7a Amplifier
8 Switch element control circuit
90 Portable telephone (electronic device)
DS0 to DS(M−1) Drive sense line (signal line)
DSS(0) to DSS(K−1) Control line (control line)
DST Drive sense switch element (switch element)
E Detection electrode (electrode)

The invention claimed is:

1. A capacitance detection method for detecting a capacitance or a change in capacitance between each of a plurality of electrodes arranged in matrix and a detected subject, the capacitance detection method comprising:
a first drive step of turning on a switch element selected among a plurality of switch elements between the electrodes and a plurality of signal lines aligned in a first direction of the matrix, based on a code sequence via a plurality of control lines aligned in a second direction intersecting the first direction and driving the plurality of signal lines at a first potential;
a read step of turning on all of the plurality of switch elements and reading a linear sum signal based on an electric charge of each of the electrodes along each of the signal lines after the first drive step; and
a detection step of detecting the capacitance or a change in capacitance by a sum-of-product computation performed on the linear sum signal and the code sequence.

2. The capacitance detection method according to claim 1, wherein the plurality of electrodes and the plurality of switch elements are formed in a touch panel.

3. The capacitance detection method according to claim 1, wherein the plurality of electrodes are formed in a touch panel, and
the plurality of switch elements are formed in a touch panel controller configured to control the touch panel.

4. The capacitance detection method according to claim 1, further comprising a second drive step of turning on another switch element selected among the plurality of switch elements on the basis of the code sequence via the control lines and driving the plurality of signal lines at a second potential different from the first potential,
wherein the read step turns on all of the plurality of switch elements and reads a linear sum signal based on an electric charge of each of the electrodes along each of the signal lines after the first and the second drive steps.

5. The capacitance detection method according to claim 4, wherein the switch element selected, based on a first value of a code sequence turns on in the first drive step, and
the switch element selected, based on a second value different from the first value of the code sequence turns on in the second drive step.

6. The capacitance detection method according to claim 5, wherein the first value is a factor "1" for driving each of the signal lines from a reference potential to the first potential,
the second value is a factor "−1" for driving each of the signal lines from the reference potential or another reference potential to the second potential, and
the code sequence is a code sequence including the factor "1" and the factor "−1" and is balanced such that a difference between the number of the factor "1" and the number of the factor "−1" in an $i^{th}$ column ($1 \leq i \leq N$) is brought closer to zero.

7. The capacitance detection method according to claim 5, wherein the first value is a factor "1" for driving each of the signal lines from a reference potential to the first potential,
the second value is a factor "−1" for driving each of the signal lines from the reference potential or another reference potential to the second potential,
the plurality of control lines include K control lines (K is plural), and
the code sequence includes K rows selected from P rows in another code sequence of P rows and N columns including the factor "1" and the factor "−1" ($K \leq N$, $K \leq P$), and is balanced such that a difference between the number of the factor "1" and the number of the factor "−1" in an $i^{th}$ column ($1 \leq i \leq N$) is brought closer to zero.

8. The capacitance detection method according to claim 1, wherein a difference between a linear sum signal along one of the signal lines and another linear sum signal along another one of the signal lines is read in the read step.

9. The capacitance detection method according to claim 1, wherein a difference between a linear sum signal based on a group including the plurality of signal lines and another linear sum signal based on another group including the other plurality of signal lines is read in the read step.

10. A position detection method for detecting, on a touch panel configured to detect a capacitance or a change in capacitance between each of a plurality of electrodes arranged in matrix and a detected subject, a position of the detected subject, the position detection method comprising:
the capacitance detection method according to claim 1; and
a position detection step of detecting a position of the detected subject on the touch panel, based on the capacitance or the change in capacitance detected in the detection step.

11. A touch panel controller configured to control a touch panel configured to detect a capacitance or a change in capacitance between each of a plurality of electrodes arranged in matrix and a detected subject, the touch panel controller comprising:

a drive circuit configured to turn on a switch element selected among a plurality of switch elements between the electrodes and a plurality of signal lines aligned in a first direction of the matrix, based on a code sequence via a plurality of control lines aligned in a second direction intersecting the first direction and drive the plurality of signal lines at a first potential;

a read circuit configured to turn on all of the plurality of switch elements and read a linear sum signal based on an electric charge of each of the electrodes along each of the signal lines; and a detection circuit configured to detect the capacitance or a change in capacitance by a sum-of-product computation performed on the linear sum signal and the code sequence.

12. The touch panel controller according to claim 11, wherein the touch panel is provided on a display surface of a liquid crystal panel, and the plurality of electrodes are used as common electrodes of the liquid crystal panel.

13. An electronic device comprising the touch panel controller according to claim 11.

* * * * *